June 13, 1939. A. B. CASPER 2,162,476
SHOCK ABSORBER FOR BICYCLES AND SIMILAR TYPE VEHICLES
Filed Jan. 17, 1938 2 Sheets—Sheet 1
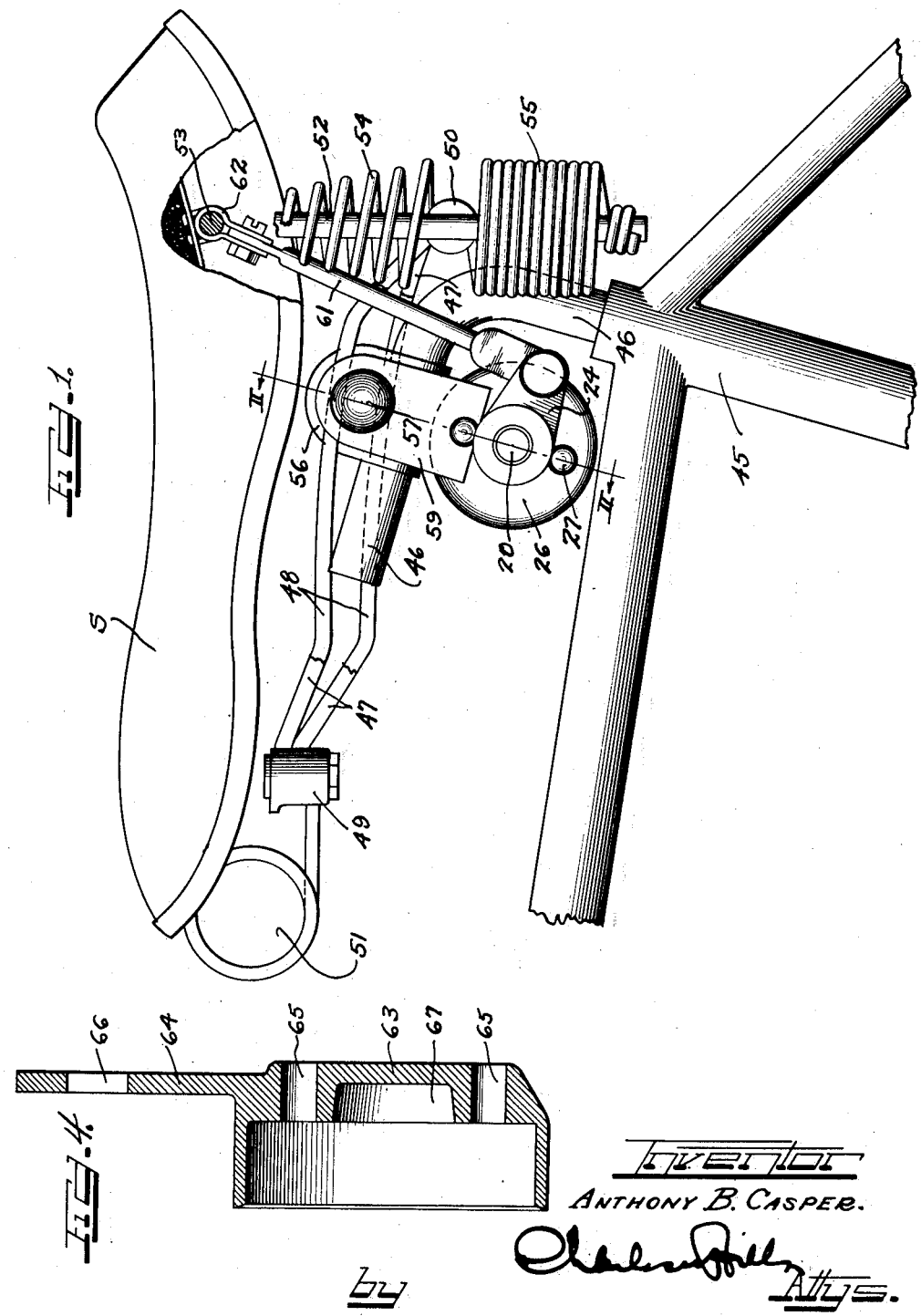
Inventor
ANTHONY B. CASPER.
by
Attys.

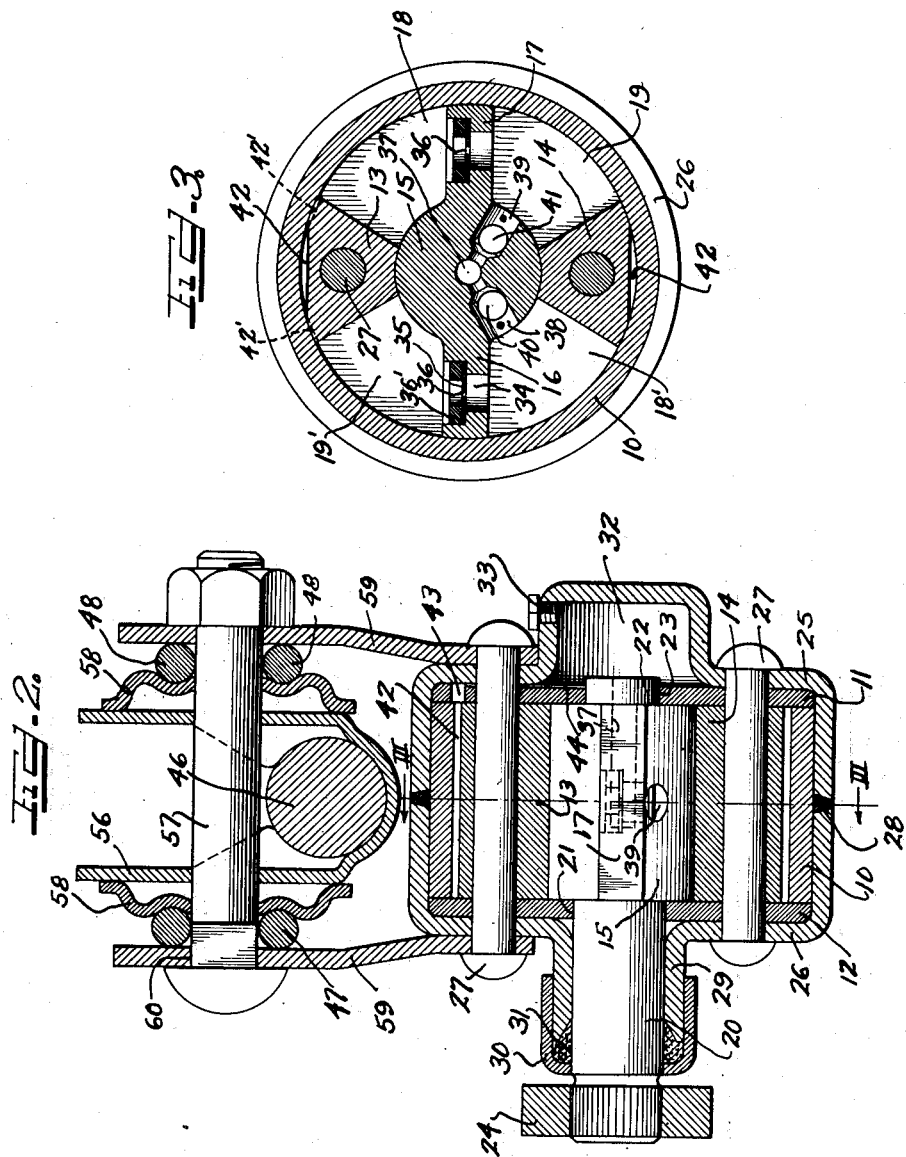

Patented June 13, 1939

2,162,476

UNITED STATES PATENT OFFICE 2,162,476

SHOCK ABSORBER FOR BICYCLES AND SIMILAR TYPE VEHICLES

Anthony B. Casper, Buffalo, N. Y., assignor to Houde Engineering Corporation, Buffalo, N. Y., a corporation of New York Application January 17, 1938, Serial No. 185,290

3 Claims. (Cl. 188—89)

This invention relates to shock absorber structure for vehicles such as bicycles, motorcycles or the like and the mounting of the shock absorbers for cooperation with the springs of the seat or saddle of the vehicle to control the spring action particularly when the vehicle is traveling over rough road.

An important object of the invention is to provide a simple, compact and economically manufactured shock absorber, preferably of the hydraulic type, which may be readily secured to the support of the seat or saddle and connected with the seat to cooperate with the seat spring to control the movement of the seat relative to its support.

A further object is to provide an improved mounting or support for the shock absorber so that a common securing means may secure the seat supporting framework and the shock absorber to the seat structure supporting post extending from the vehicle frame and without interfering with the adjustment of the seat structure on the post.

The various features of the invention are incorporated in the structure showing on the drawings, in which drawings:

Figure 1 is a side elevation of the upper part of a vehicle, such as a bicycle, and the seat or saddle structure thereon and with my improved shock absorber applied;

Figure 2 is an enlarged section on plane II—II of Figure 1;

Figure 3 is a section on plane III—III of Figure 2; and

Figure 4 is a cross section showing a modified structure for the shock absorber body.

The shock absorber structure shown comprises a cylinder defining ring 10 between inner and outer side disks or walls 11 and 12. Within the ring 10 are diametrally opposite partition members 13 and 14 engaging at their outer ends against the inner side of the ring. The piston structure for the shock absorbers comprises a cylindrical hub 15 which bears against the inner surfaces of the partitions 13 and 14 and has vanes 16 and 17 extending in diametrally opposite direction for bearing engagement at their ends with the inner side of the ring 10, the piston structure and the partitions dividing the space within the ring into diametrally opposite hydraulic working chambers 18, and 18' and 19, 19'.

The piston hub 15 has a shaft end 20 extending therefrom through the bearing opening 21 in the outer end disk 12 and the short inner shaft end 22 as bearing in the opening 23 in the inner end disk 11, the shaft end 20 being adapted at its outer end to receive a lever arm 24 by which the piston structure is rotated or oscillated.

Cup shape enclosing frames 25 and 26 receive the ring and disk assembly, bolts or rivets 27 extending through the frames, the end disks, and the partitions 13 and 14 to securely clamp the frames to hold the end disks against the sides of the partitions 13 and 14. Preferably a sealing gasket 28 is inserted between the edges of the frames 25 and 26 so as to prevent leakage or escape of the hydraulic fluid.

The clamping or enclosing frame part 26 has the axial deflection 29 forming a bearing for the shaft end 20, a cap or gland 30 receiving the shaft end and frictionally fitting the bearing extension 29 to compress packing material 31 around the shaft to prevent leakage of the hydraulic fluid to the exterior along the shaft end.

The working chambers are kept filled with hydraulic fluid and a reservoir 32 for fluid may be provided by deflecting the frame cup 25, a filler plug 33 for the reservoir being provided as shown.

Each of the vanes 16 and 17 of the piston structure has a passageway 34 therethrough intercepted by a metering disk 35 provided with a metering orifice 36, the disk being held in place as by a plug 36'. During oscillation of the piston structure the displaced fluid will flow from the working chambers 18, 18' to the working chambers 19, 19', or in reverse direction, the flow being resisted and metered by the orifices 36 so that the operation of the piston structure is properly dampened. The orifice disks are thin so that the rate of flow through the orifices will not be influenced by variations in viscosity of the hydraulic fluid.

In order to keep the working chambers supplied with fluid from the reservoir 32, the reservoir has communication with the lower working chambers 18' and 19 by way of the bore 37 in the piston hub 15 and the passageways 38 and 39 leading from the bore to the chambers 18' and 19 respectively, the passageways being controlled by check valves 40 and 41 which may be in the form of balls as shown. When the piston structure rotates in clockwise direction, the fluid is displaced from the working chambers 19 and 19' to the chambers 18 and 18', the check valve 41 then closing the passageway 39 so that fluid cannot be forced from the chamber 19 into the reservoir. During counter-clockwise rotation of the piston structure the fluid will be displaced from the chambers 18 and 18' and the check valve 40 will close. This check valve 40 is open during clockwise rotation of the piston structure for flow of replenishing fluid from the reservoir into the chamber 18', and during counter-clockwise rotation of the piston structure the check valve 41 will be opened for a flow of fluid from the reservoir into the chamber 19. The working chambers will therefore be always filled with hydraulic fluid.

At their outer sides the partitions 13 and 14 are partially flattened to leave the passageways 42 between the partitions and the ring 10. The upper passageway 42 is connected by vent grooves 42' with the working chambers 18 and 19', and communicates with a passageway 43 in the end disk 11 and this disk has the restricted channel 44 in its outer face for connecting the passageway 43 with the reservoir 32 so that any air or gas bubbles which may accumulate at the top of the upper working chambers may escape to the reservoir, and likewise any fluid forced through the vent grooves into the upper channel 42 will flow back to the reservoir.

Referring to Figure 1, I have shown the upper part of a bicycle frame 45 and the saddle post 46 extending therefrom with its upper end deflected forwardly. As shown, the wire supporting frame for the seat or saddle S comprises side pairs of wire bars 47 and 48 secured at their front ends to a support 49 and at their rear ends to a support 50. The seat at its front end is connected by a spring loop 51 with the support 49 and from the rear end of the seat depends the U-bar or frame 52 whose yoke part 53 is hinged to the seat. The depending legs of the U-bar each receive an upper compression spring 54 and a lower tensioning spring 55, the springs at their adjacent ends being anchored to the support 50, the upper springs 54 abutting the seat or saddle, and the lower spring 55 being anchored at their lower ends to the ends of the U-bar legs.

In the type of bicycle shown, the means for securing the seat structure to the post 46 includes a U-shaped clamping jaw 56 for receiving the post, the jaw legs receiving a bolt 57 which extends between the upper and lower wires or bars 47 and 48, washers 58 being interposed between the wires and the clamp frame legs as clearly shown in Figure 2.

The shock absorber is provided with suspension plates 59 which may be welded to the enclosing walls 25 and 26 and which may also receive one of the bolts or rivets 27. At their upper ends the suspension plates have holes 60 for receiving the bolt 57, the plates engaging against the outer sides of the wires 47 and 48. The holes 60 are preferably polygonal and the shank of the bolt 57 under its head is correspondingly shaped so that the bolt will be held against turning when the threaded nut is applied thereto.

A link 61 connects at its lower end with the arm 24 extending from the piston structure of the shock absorber, and at its upper end the link is secured to a strap 62 which encircles the yoke part of the saddle spring supporting U-bar 53. vertical swing of the saddle or seat head relative to the vehicle frame is resisted and cushioned by the springs 51, 54 and 55 and the spring action is modified by the hydraulic shock absorber so that the seat movement under the weight of the rider and road impact is more uniform and less abrupt, the arrangement resulting in easier and more comfortable riding.

As the shock absorber structure is supported entirely by the seat structure and the seat supporting post 46, the post and seat structure may be readily adjusted vertically on the bicycle frame without in any wise disturbing the shock absorber and seat assembly. The shock absorber is also entirely below and within the sides of the seat so that it will not interfere with the legs of the rider. The seat may also be adjusted forwardly or rearwardly on the post 46 without disturbing the shock absorber.

In the construction of the shock absorber as shown on Figure 2, the enclosing frames 25 and 26 are sheet metal and the suspension plates 59 are also of sheet metal. It is evident that the frames 25 and 26 may be in the form of die castings, or that the respective suspension plates and frames may form part of a single die casting or malleable casting.

Figure 4 shows the frame member 63 and a suspension arm 64 thereon forming part of an integral structure, the frame having the holes 65 for the bolts which secure the shock absorber parts together and the arm having the hole 66 for the bolt which supports the shock absorber structure to the vehicle. The body 63 may be cored out to provide the hydraulic fluid reservoir 67.

I have thus provided a simple, compact, and economically manufactured shock absorber structure and a simple mounting therefor on a vehicle, such as a bicycle, for cooperation with the vehicle seat supporting springs for cushioning and smoothing out the seat movements particularly when the vehicle is traveling over rough roads. I do not desire to be limited to the exact structure and arrangement shown and described, as changes and modifications may be made without departing from the scope of the invention.

I claim as follows:

1. A hydraulic shock absorber adapted particularly for association with the saddle of a bicycle or the like for modifying the action of the saddle spring suspension assembly, comprising a cylindrical ring, hydraulic chamber defining partitions extending radially inwardly from said ring at diametrically opposite sides thereof, side walls in the form of disks engaging the ends of said ring and said partitions, a piston structure comprising a hub extending between said side walls and said partitions and having a driving shaft extending outwardly through one of said side walls, vanes on said hub, an enclosing housing comprising cup shaped halves receiving said ring and said side walls, bolts extending through said housing halves, said side walls and said partitions for securing said parts together axially, a lever extending from the piston structure shaft, a supporting arm extending from one of said bolts for supporting the shock absorber, oscillation of said piston structure causing displacement of hydraulic fluid on one side of said partition to the other, and means for controlling the hydraulic flow.

2. A hydraulic shock absorber adapted particularly for association with the saddle of a bicycle or similar vehicle for modifying the operation of the saddle spring suspension, comprising a cylindrical ring, partitions extending from said ring radially inwardly, side walls in the form of disks engaging the ends of said ring and said partitions, a piston structure comprising a hub extending between said side walls and said partitions and having a drive shaft extending through one of said side walls, vanes on said piston hub defining with said partitions hydraulic working chambers, an enclosing housing comprising cup-shaped halves surrounding said ring and said side walls, bolts extending through said housing halves, said side walls and said partitions for rigidly securing said parts together axially, oscillation of said piston structure causing displacement of hydraulic fluid by said vanes in said working chambers, means providing flow restricted passageways for dampening the flow of the displaced fluid, one of said side walls being deflected to provide a fluid reservoir chamber, and passageways for conducting hydraulic fluid from said reservoir chamber to said working chambers.

3. A hydraulic shock absorber adapted particularly for association with the saddle of a bicycle or like vehicle for modifying the operation of the spring suspension for the saddle, comprising a cylindrical ring, partitions extending radially inwardly from said ring, side walls in the form of disks engaging the ends of said ring and said partitions, a piston structure comprising a hub extending between said side walls and said partitions and having a drive shaft extending through one of said side walls, a bearing extension at the other end of said hub engaging in the other side wall, vanes on said hub extending between said partitions and with said partitions defining hydraulic working chambers, an enclosing housing comprising cup shaped halves receiving and surrounding the side walls and said ring and said drive shaft extending through one of said halves, bolts extending through said housing halves, said side walls and said partitions for securing said parts together axially, the side wall at the inner end of said hub being deflected outwardly to provide a reservoir space adjacent to the hub bearing extension extending through said side wall, means providing passageways for restricting the flow of the fluid displaced from said working chambers upon oscillation of said piston structure, a bore extending into said hub and through the bearing extension thereof for communication with the reservoir space, and outlets from said bore to the working chambers for flow of replenishing fluid from said reservoir space to the working chambers.

ANTHONY B. CASPER.